United States Patent [19]

Arciero et al.

[11] Patent Number: 4,643,269

[45] Date of Patent: Feb. 17, 1987

[54] POWER STEERING SYSTEM FOR AN AUTOMOTIVE VEHICLE HAVING A POWER STEERING PUMP CUT OUT CIRCUIT

[75] Inventors: Carlo Arciero, Livonia, Mich.; Mohammed K. Mynuddin, Irvine, Calif.

[73] Assignee: Ford Motor Company, Dearborn, Mich.

[21] Appl. No.: 786,395

[22] Filed: Oct. 10, 1985

[51] Int. Cl.[4] .............................................. B62D 5/04
[52] U.S. Cl. ................................... 180/141; 180/143; 192/0.033; 192/3.56
[58] Field of Search .................... 180/143, 142, 141; 91/434; 74/388 PS; 417/79, 87; 192/0.076, 103 R, 0.032, 0.033, 3.56

[56] References Cited

U.S. PATENT DOCUMENTS

| 3,565,223 | 2/1971 | Pierce | 192/30 V |
| 3,614,266 | 10/1971 | Ciampa et al. | 417/79 |
| 3,645,647 | 2/1972 | Ciampa et al. | 417/79 |
| 4,275,798 | 6/1981 | Nishikawa et al. | 180/143 |
| 4,457,390 | 7/1984 | Abe et al. | 180/142 |
| 4,570,735 | 2/1986 | Duffy | 180/142 |

FOREIGN PATENT DOCUMENTS

| 47901 | 1/1979 | Japan | 180/143 |
| 48004 | 4/1980 | Japan | 180/143 |
| 22967 | 2/1982 | Japan | 180/143 |

Primary Examiner—John J. Love
Assistant Examiner—Mitchell J. Hill
Attorney, Agent, or Firm—K. L. Zerschling; D. J. Harrington

[57] ABSTRACT

A power steering system for an automotive vehicle including a power steering gear, a fluid pressure pump for developing steering pressure and an electromagnetic clutch for connecting the pump to an engine driven pulley at low vehicle speeds and for disabling the pump at high vehicle speeds, and an electric circuit that prevents activation and deactivation of the pump during turning maneuvers.

4 Claims, 2 Drawing Figures

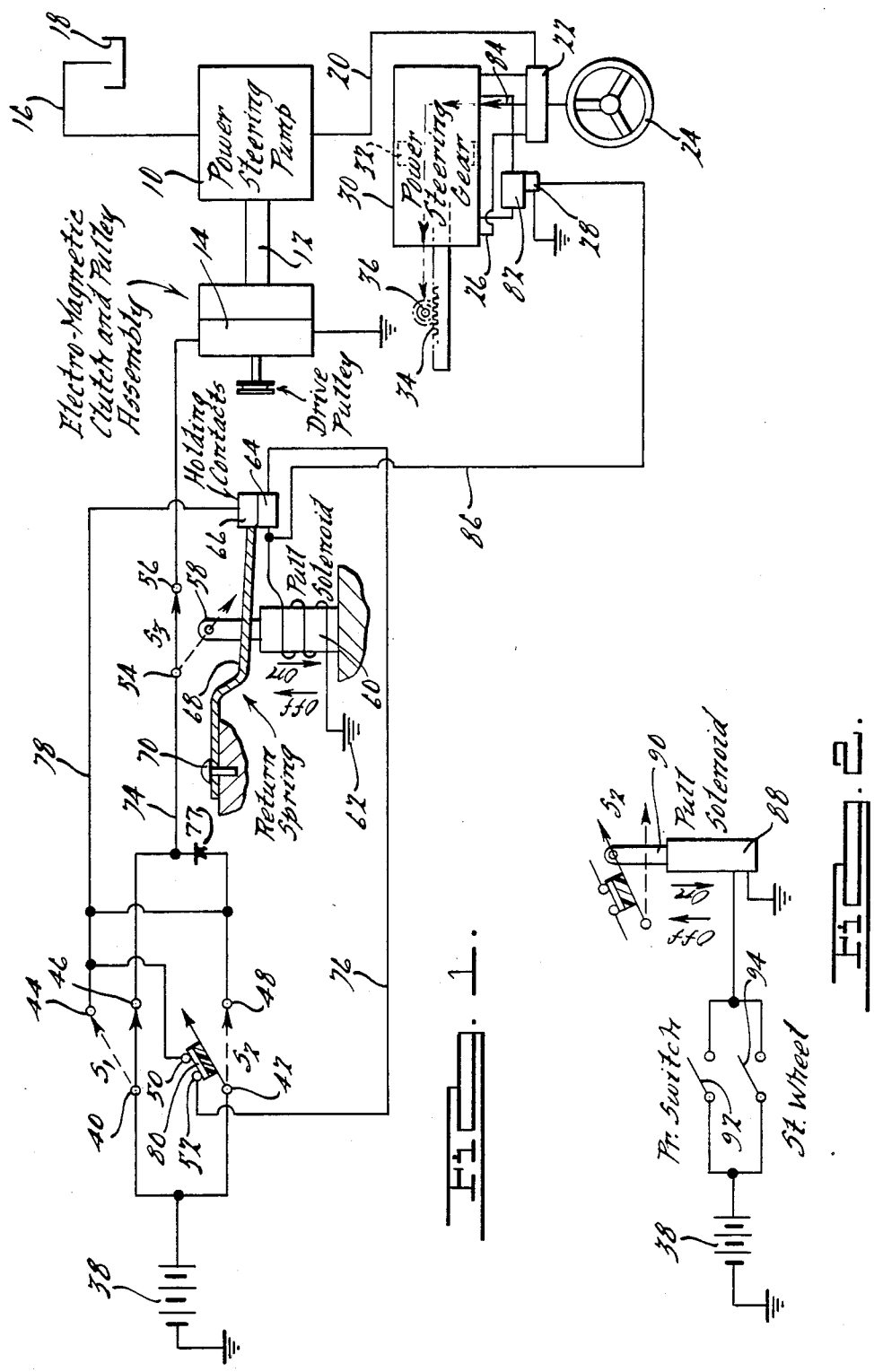

POWER STEERING SYSTEM FOR AN AUTOMOTIVE VEHICLE HAVING A POWER STEERING PUMP CUT OUT CIRCUIT

GENERAL DESCRIPTION OF THE INVENTION

This invention relates to automotive vehicles, particularly to power steering systems for controlling steering maneuvers of the vehicle. A typical power steering system for a vehicle capable of embodying the improvements of my invention can be seen by referring to U.S. patent application Ser. No. 663,267, filed Oct. 22, 1984, by James J. Duffy, now U.S. Pat. No. 4,570,735.

Such power steering systems may include a rack and pinion mechanism wherein the rack that is engaged by the pinion is actuated by a fluid pressure operated motor having a working pressure chamber on each side of the motor piston. The rack is mechanically connected to the dirigible wheels of the vehicle, and the pinion is connected to the steering shaft by a torsion bar. A power steering pump driven by the vehicle engine provides working fluid pressure and a valve system under the control of the vehicle operator controls pressure distribution from the pump to the working chambers of the fluid motor to effect steering maneuvers.

In a steering system of this kind the dynamic steering efforts are much less than the static steering efforts. That is, when the vehicle is in motion, the effort required to angularly displace the dirigible wheels is less than the corresponding steering torque required to angularly displace the wheels when the vehicle is operating at a slow speed or is stationary. Thus the power assist that is required for steering the vehicle while stalled or moving at a slow speed is greater than that required for steering maneuvers when the vehicle is operated at cruising speeds. The pressure requirements of the system, therefore, are greater at low speeds than at high speeds.

The magnitude of the steering torque generally is a function of vehicle speed. We have taken this characteristic into account by providing a means for conserving energy by utilizing the power assist when it is most needed and eliminating the power assist at cruising speeds. We have done this by cutting out the pump and rendering it inactive after the vehicle achieves a critical road speed. The steering efforts at vehicle speeds higher than the critical speed are entirely manual steering efforts, and the vehicle operator thus has a greater sense of road feel during high speed steering maneuvers than he otherwise would have if the power assist function were to be extended into the high speed range.

Since the pump is rendered inactive at speeds higher than the critical speed, parasitic horsepower loss is reduced and the fuel efficiency of the vehicle engine is increased. This is especially significant since a high percentage of all driving time is done at speeds above the critical speed, which may be in the 20 to 25 miles per hour range.

We recognize that it is undesirable to allow the power steering pump to become deactivated while the vehicle is in a turning maneuver since a sudden change in steering effort while turning would be noticeable by the driver. The same is true with respect to reactivation of the pump following its deactivation when the vehicle is in a turning maneuver and the speed of the vehicle during that turning maneuver increases from a speed below the critical speed to a speed above the critical speed.

The pump is deactivated by disengaging an electromagnetic clutch connection between the vehicle crankshaft pulley and the driving shaft for the power steering pump. Our invention comprises a circuit for controlling the clutch which in turn controls activation and deactivation of the pump while preventing deactivation or reactivation of the pump during turning maneuvers. The circuit allows the pump to be cut in or cut out only when the vehicle is operated in a straight ahead driving mode.

If desired, the steering efforts during the manual steering mode at speeds higher than the critical speed can be varied merely by designing the steering gear with an appropriate overall steering ratio. In general, the most desirable steering ratio would be a ratio that provides a higher mechanical advantage during the manual steering mode than the mechanical advantage that would be used with a steering gear mechanism for a typical vehicle having full time steering power assist.

Other disclosures in the prior art, like the present disclosure, indicate a need for changing the percentage of power assist at high speeds to achieve an increase in fuel economy and to provide increased road feel at high speeds while maintaining a high degree of power assist during parking maneuvers or when the vehicle is operated at low speeds. For example, the previously mentioned U.S. Pat. No. 4,570,735 recognizes this problem, but it solves it by providing a dual function valve arrangement that changes the magnitude of the fluid flow area through the valve system at high speeds relative to the fluid flow area at low speeds. The improvement of our invention does not require a special valve system.

Another example of a speed sensitive power steering system is described in application Ser. No. 657,559, filed Oct. 4, 1984, which shows a variable orifice solenoid valve that is under the control of a speed sensing module. The valve controls the bypass valve in a power steering pump so that at high speeds more fluid is bypassed than at low speeds. This increases the steering effort at high speeds relative to the steering effort at low speeds. The back pressure on the pump thus is reduced at high speeds, and this results in an overall fuel economy improvement.

Another example of a speed sensitive power steering system that increases the bypass flow in a power steering pump at high speeds is shown in application Ser. No. 642,466, filed Aug. 20, 1984, now U.S. Pat. No. 4,586,582. All of the applications to which we make reference in this specification are assigned to the assignee of this invention.

BRIEF DESCRIPTION OF THE FIGURES OF THE DRAWINGS

FIG. 1 shows in schematic form a power steering pump cut-out circuit.

FIG. 2 shows a modification of a portion of a switching circuit for the circuit of FIG. 1.

PARTICULAR DESCRIPTION OF THE INVENTION

FIG. 1 shows a power steering pump 10. It includes a driving shaft 12 that is adapted to be connected to a drive pulley. That pulley in turn is connected by a belt and pulley drive mechanism to the crankshaft of an internal combustion engine. The connection between the driveshaft 12 and the drive pulley is accomplished by an electromagnetic clutch 14.

Reference may be made to U.S. Pat. Nos. 3,614,266 and 3,645,647 for examples of power steering pumps that are used in a system of this type. The '647 patent shows a crankshaft driven pump and the '266 patent shows a pulley driven pump. For purposes of this disclosure, however, I have chosen to describe a pulley driven pump such as that shown in the '266 patent.

An example of an electromagnetic clutch that may be used to connect the drive pulley to the shaft 12 may be seen by referring to U.S. Pat. No. 3,565,223, which discloses an electromagnetic clutch for an air conditioning compressor for the automotive vehicle. Patents '266 and '647 are assigned to the assignee of this invention, and patent '223 is assigned to Pitts Industries, Inc.

The pump 10 receives fluid from supply passage 16 which communicates with the reservoir 18. The pump high pressure outlet passage 20 communicates with a driver controlled steering gear valve 22. The operation of that valve is similar to the operation of the steering valves of the previously described Duffy disclosures. Valve 22 responds to steering torque applied to the vehicle steering wheel 24 to distribute pressure from the pump passage 20 to each of two distributor passages 26 and 28 which communicate with a power steering cylinder 30. A power steering piston 32 in the cylinder 30 is integral with or is connected to a steering gear rack 34, which engages the driver controlled steering gear pinion 36. Rack 34 is connected to the steering linkages for the vehicle dirigible wheels.

A vehicle battery, which may be the usual 12 volt wet cell battery shown at 38, is connected to switch terminals 40 and 42 for switch $S_1$ and switch $S_2$, respectively. Switch $S_1$ is a double pole switch having two output terminals 44 and 46, and switch $S_2$ is a double pole switch having an output terminal 48 and an output terminal pair shown at 50 and 52.

A solenoid operated switch $S_3$ has an input terminal 54 and a single output terminal 56. The armature of the switch $S_3$ is connected through the armature 58 of an electrical pull solenoid 60. Electrical windings for the solenoid 60 are grounded at 62 and the other end of the winding is connected to one of pair of holding contacts as shown at 64 and 66.

Holding contact 66 is connected to and supported by cantilever spring 68 which is anchored at 70 to a stationary member.

Terminal 54 of switch $S_3$ is connected to output terminals 46 and 48 of the switches $S_1$ and $S_2$, respectively, through the electrical connection 74. Contact 64 of the holding contacts is connected by connection 76 to terminal 52 of the switch $S_2$. Rectifier 77 is interposed between connection 74 and terminal 48 to prevent a short circuit from terminal 46 holding contact 66 and the pull solenoid windings when switch $S_1$ shifts from the high speed position to the low speed position, thereby preventing the switch $S_3$ from assuming a high speed position as the switch $S_1$ assumes a low speed position. Contact 66 of the holding contacts is connected by connection 78 to each of the terminals 44, 50 and 48.

Switch $S_1$ is a vehicle speed sensing switch. That is, it responds to the output signal of a vehicle speed sensor. At speeds less than a critical speed, such as 20 miles per hour switch $S_1$ connects terminal 40 with terminal 46 and breaks the connection between terminal 40 and terminal 44. At speeds greater than that critical speed terminals 40 and 44 are connected, and the connection between terminals 40 and 46 is broken.

Switch $S_2$ is a steering wheel position switch. That is, it responds to angular movement of the steering wheel so that it assumes the dotted line position shown in FIG. 1 during turning maneuvers in either direction and the full line position shown in FIG. 1 during straight ahead driving. When switch $S_2$ is in the straight ahead driving position, switch contact 80 for the switch $S_2$ closes the circuit between terminals 50 and 52.

Switch $S_3$ assumes the dotted line position when the vehicle is operated at high speeds thereby interrupting the circuit for the electromagnetic clutch 14. When the switch $S_3$ is in the full line position, the electromagnetic clutch circuit is completed. The switch $S_3$ assumes the dotted line position when the pull solenoid 60 is energized.

The pull solenoid includes a spring that returns the armature 58 so that the switch $S_3$ closes. This opens the holding contacts 64 and 66. The return spring for the pull solenoid 60 may be the cantilever spring 68.

If it is assumed that the vehicle is operating at speeds less than the critical speed, switch $S_1$ closes the circuit to terminal 54 and switch $S_3$ is closed thereby closing the electromagnetic clutch circuit and allowing the power steering pump to be activated. If a turning maneuver occurs switch $S_2$ connects terminal 42 and 48, but this has no effect on the clutch since switches $S_1$ and $S_2$ are in parallel. The holding contacts are separated so the pull solenoid is deactivated.

If the vehicle speed exceeds the critical value, terminals 40 and 44 become connected; and if the vehicle is operating with the steering linkage in the straight ahead condition, terminals 50 and 52 are connected and the pull solenoid is energized. This causes contact 66 and 64 to become engaged and the holding circuit for the electromagnetic clutch then is activated. A steering maneuver at such high speeds will cause terminals 42 and 48 to become closed, but since switch $S_3$ is opened by reason of the action of the holding contacts and the pull solenoid, the circuit for the electromagnetic clutch remains open. If the vehicle is traveling over 20 miles per hour and a turning maneuver is initiated, and if during the turning maneuver the speed should drop below the critical value, the pull solenoid will remain applied notwithstanding the fact that contacts 50 and 52 are disconnected. This is due to the fact that terminals 42 and 48 become connected and contact 66, which is connected to terminal 48, becomes connected to energized terminal 42 thus maintaining the pull solenoid in an energized state.

If during a turning maneuver the speed should change from a value below the critical speed to a value above the critical speed, it is not possible to deenergize the electromagnetic clutch since during a turning maneuver terminals 42 and 48 of switch 32 are connected.

I have shown schematically in FIG. 1 a bypass valve 82 between the opposed sides of the power steering piston 32. This valve is adapted to provide an open flow connection between the pressure chambers of the power steering gear when the steering system is in the manual steering mode. Thus fluid displaced from one power steering chamber is received by the other through the bypass passage. Valve 82 is opened by a valve actuator 28 which is connected to the solenoid windings through connection 86. Thus whenever the solenoid is energized the actuator 28 is triggered thereby opening the valve 82. The steering shaft 84 controls steering valve 22.

In FIG. 2 I have shown an alternate embodiment for switch $S_2$. This embodiment comprises a parallel connection between vehicle battery 38 and a pull solenoid 88. The armature 90 for solenoid 88 is connected to switch $S_2$ to move it between the turn position shown by a dotted line and the straight ahead position shown by a full line. When the pull solenoid is actuated, the switch assumes the turn position as in the case of the FIG. 1 embodiment.

Solenoid 88 is actuated when either a pressure switch 92 or steering wheel turn switch 94 is closed. Switches 92 and 94 are in parallel. Switch 94 acts so that it is open during straight ahead driving conditions and closed during turning maneuvers. Pressure switch 92 is closed when the pressure in the steering system is high and is closed when the pressure is low. This allows the pull solenoid 88 to be energized if the pressure is high which indicates the vehicle is in a turning maneuver.

Having described our invention, what we claim and desire to secure by U.S. Letters Patent is:

1. In a power steering system for an engine powered vehicle having steerable wheels, said steering system having a fluid pressure pump, a pulley connected drivably to said engine, a fluid motor having a piston connected to said wheels for directional control thereof, and a driver actuated valve means communicating with said pump for controlling distribution of steering pressure to said fluid motor;

an electromagnetic clutch means for connecting said pulley with said pump whereby said pump is actuated when said clutch is applied;

a source of voltage;

and a pump cut-out circuit establishing an electrical connection between said clutch and said voltage source, said circuit comprising a vehicle speed sensing switch means for activating said clutch when the vehicle speed is less than a critical speed and breaking a circuit between said voltage source and said clutch when the vehicle speed is greater than said critical speed, and a directional steering switch means for overruling the action of said speed sensing switch when the vehicle speed increases above or decreases below said critical speed when said vehicle is in a turning maneuver.

2. The combination as set forth in claim 1 wherein said circuit includes a pump cut-out switch in series relationship with respect to said speed sensing switch means and said directional steering switch means, said speed sensing switch means and said directional steering switch means being in parallel relationship, and a holding circuit means for keeping open said cut-out switch when said vehicle speed sensing switch means is open regardless of whether said directional steering switch means is in a position corresponding to a turning maneuver.

3. The combination as set forth in claim 1 wherein said fluid motor includes a bypass passage between opposite sides of said piston, and valve means for opening said bypass passage when said clutch is disengaged.

4. The combination as set forth in claim 2 wherein said fluid motor includes a bypass passage between opposite sides of said piston, and valve means for opening said bypass passage when said clutch is disengaged.

* * * * *